United States Patent
Gao et al.

(10) Patent No.: US 9,392,273 B2
(45) Date of Patent: Jul. 12, 2016

(54) ADAPTIVE DATA TRANSMISSION RATE CONTROL FOR A WIRELESS DISPLAY DEVICE

(71) Applicant: Intel Corporation, Santa Clara, CA (US)

(72) Inventors: Jie Gao, Sunnyvale, CA (US); Xintian E Lin, Palo Alto, CA (US); Inching Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 309 days.

(21) Appl. No.: 13/952,133

(22) Filed: Jul. 26, 2013

(65) Prior Publication Data

US 2013/0315298 A1    Nov. 28, 2013

Related U.S. Application Data

(63) Continuation of application No. 12/924,231, filed on Sep. 23, 2010, now Pat. No. 8,520,728.

(51) Int. Cl.

| | | |
|---|---|---|
| *H04N 11/02* | (2006.01) | |
| *H04N 7/12* | (2006.01) | |
| *H04N 11/04* | (2006.01) | |
| *H04N 19/146* | (2014.01) | |
| *H04N 21/41* | (2011.01) | |
| *H04N 21/4143* | (2011.01) | |
| *H04N 21/4363* | (2011.01) | |
| *H04N 21/4402* | (2011.01) | |
| *H04N 21/442* | (2011.01) | |
| *H04L 29/06* | (2006.01) | |

(52) U.S. Cl.
CPC ...... *H04N 19/00169* (2013.01); *H04L 65/4084* (2013.01); *H04L 65/80* (2013.01); *H04N 19/146* (2014.11); *H04N 21/4122* (2013.01); *H04N 21/4143* (2013.01); *H04N 21/43637* (2013.01); *H04N 21/4402* (2013.01); *H04N 21/44227* (2013.01)

(58) Field of Classification Search
None
See application file for complete search history.

(56) References Cited

U.S. PATENT DOCUMENTS

| | | | |
|---|---|---|---|
| 6,785,323 B1 * | 8/2004 | Proctor, Jr. | ..................... 375/146 |
| 7,477,688 B1 | 1/2009 | Zhang et al. | |

(Continued)

OTHER PUBLICATIONS

"U.S. Appl. No. 12/924,231, Non Final Office Action mailed Jan. 11, 2013", 13 pgs.

(Continued)

*Primary Examiner* — Frederick Bailey
*Assistant Examiner* — Talha M Nawaz
(74) *Attorney, Agent, or Firm* — Schwegman Lundberg & Woessner, P.A.

(57) ABSTRACT

A method, a computer readable medium and an apparatus to adaptively control a data transmission rate of a wireless display device. The method includes determining a current data transmission rate capacity of a wireless channel; and controlling a data transmission rate of a wireless transmission device based on the current data transmission rate capacity.

18 Claims, 2 Drawing Sheets

(56) References Cited

U.S. PATENT DOCUMENTS

| | | | |
|---|---|---|---|
| 7,505,480 B1 | 3/2009 | Zhang et al. | |
| 7,895,629 B1* | 2/2011 | Shen et al. | 725/62 |
| 8,184,720 B2 | 5/2012 | Onur et al. | |
| 8,520,728 B2 | 8/2013 | Gao et al. | |
| 2005/0289631 A1 | 12/2005 | Shoemake et al. | |
| 2006/0153291 A1* | 7/2006 | Christison | 375/240.01 |
| 2007/0153916 A1* | 7/2007 | Demircin et al. | 375/240.26 |
| 2008/0192815 A1 | 8/2008 | Yun et al. | |
| 2009/0196343 A1 | 8/2009 | Cho et al. | |
| 2010/0166065 A1* | 7/2010 | Perlman et al. | 375/240.07 |
| 2010/0167816 A1* | 7/2010 | Perlman et al. | 463/30 |
| 2010/0189063 A1* | 7/2010 | Kokku et al. | 370/329 |
| 2010/0328528 A1* | 12/2010 | Eggert | 348/425.2 |
| 2011/0105226 A1* | 5/2011 | Perlman | 463/30 |
| 2011/0107220 A1* | 5/2011 | Perlman | 715/720 |
| 2011/0122786 A1 | 5/2011 | Koo et al. | |
| 2012/0147946 A1 | 6/2012 | Gao et al. | |

OTHER PUBLICATIONS

"U.S. Appl. No. 12/924,231, Notice of Allowance mailed Apr. 29, 2013", 14 pgs.

"U.S. Appl. No. 12/924,231, Response filed Apr. 11, 2013 to Non-Final Office Action mailed Jan. 11, 2013", 13 pgs.

"International Application Serial No. PCT/US2011/053143, International Preliminary Report on Patentability mailed Apr. 4, 2013", 8 pgs.

"International Application Serial No. PCT/US2011/053143, International Search Report mailed Apr. 20, 2012", 3 pgs.

"International Application Serial No. PCT/US2011/053143, Written Opinion mailed Apr. 20, 2012", 6 pgs.

\* cited by examiner

ADAPTIVE DATA TRANSMISSION RATE CONTROL FOR A WIRELESS DISPLAY DEVICE

This application is a continuation of U.S. patent application Ser. No. 12/924,231, filed on Sep. 23, 2010, which is incorporated herein by reference in its entirety.

FIELD

Some embodiments pertain to wireless communications. Some embodiments pertain to a video data compression for a wireless display device.

BACKGROUND

Wireless capability allows a variety of devices to communicate with each other adding to the mobility of users. A computing device, such as a Personal Computer (PC), may be used with various peripherals which are not wired together, but rather communicate using wireless communications, such as Wireless Local Area Network (WLAN) type protocols. As operations are performed by the PC, changes to information for display are sent to a wireless display device. Wireless display is a technology in which image information, such as video information, on a computer display/screen is firstly captured and encoded, and is then wirelessly transmitted to an adaptor, for example through WiFi. The video data is then decoded and displayed on another screen, such as a screen on a high definition television HDTV. Since the encoded video data is transmitted over a wireless channel, the video quality is highly dependent on channel conditions, which condition may detrimentally change to adversely affect video quality on the display screen

DETAILED DESCRIPTION

Figure 1:
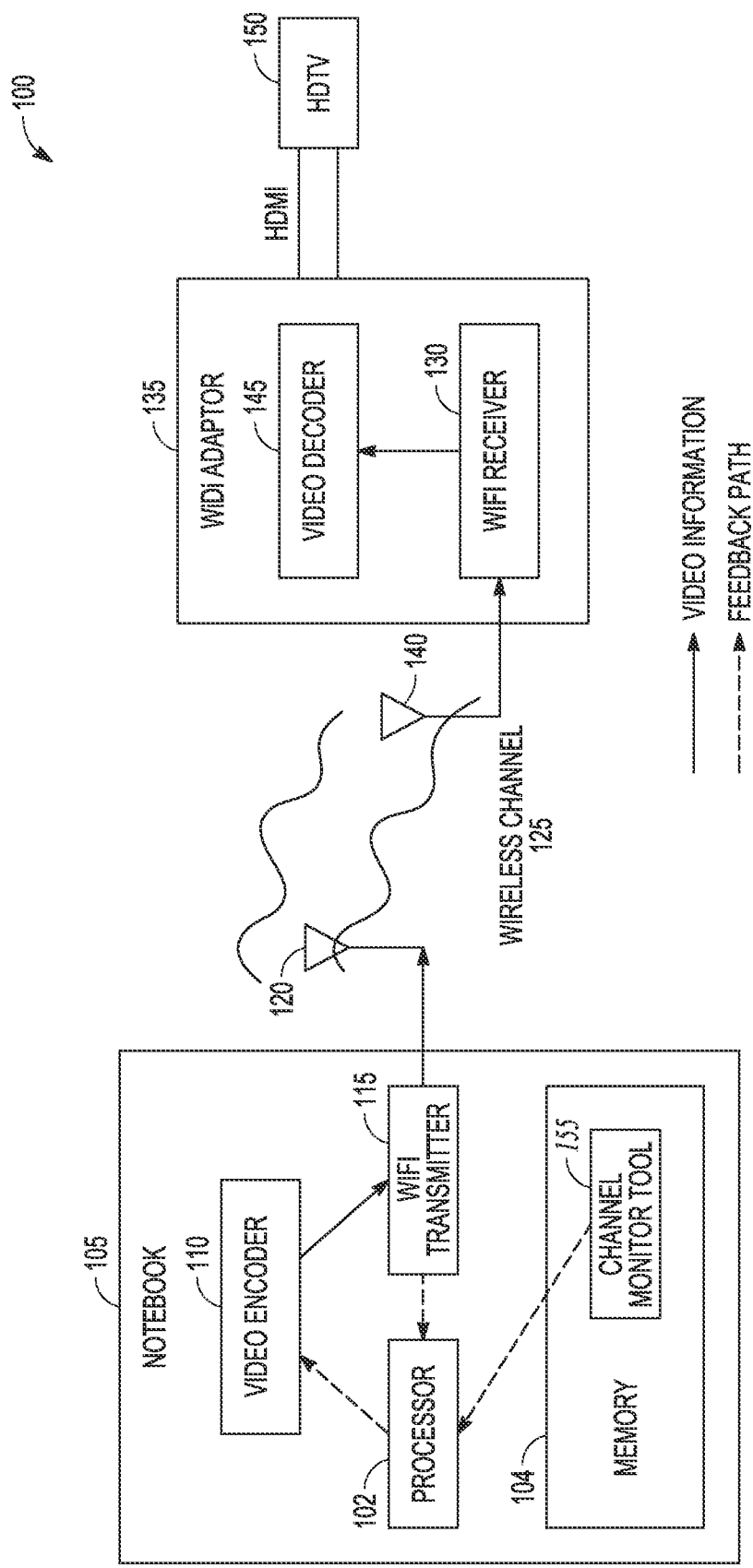
FIG. 1 illustrates a system embodiment in block diagram format.

The following description and the drawings sufficiently illustrate specific Embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims. Embodiments may be referred to herein, individually or collectively, by the term "invention" merely for convenience and without intending to limit the scope of this application to any single invention or inventive concept if more than one is in fact disclosed.

WLAN protocols and devices enable mobility and flexibility in computing systems, where devices and components may be implemented using wireless technology. For example, a PC may include a wireless processing unit, a wireless keyboard, a wireless mouse, and a wireless display. The PC then sends wireless signals to a display or other unit which contains a wireless adaptor for receiving wireless signal, thus reducing the wired connections of a system. A system using for example WLAN 802.11 a/b/g/n protocol signaling enables hundreds of Megabits wireless applications over LAN using OFDM technology. Since the 802.11b/g/n protocol may use the 2.4 GHz license free band, those wireless devices may occasionally suffer interference from microwave ovens, cordless telephones and Bluetooth devices. Network resources may also be shared with other 802.11 b/g/n wireless devices and applications and may therefore causes co-channel and adjacent channel interference. The quality of the received wireless signal is strongly dependent on the channel condition, which is in turn dependent on the sharing of channel resources with other wireless devices and applications. We have found that optimizing the amount of data transmitted using the wireless communication channels is critical for the successful video/audio transmission. For example, existing wireless display systems implement static video encoding, typically with an average bit rate of about 8 Mbps with video content, regardless of the channel condition. Should the channel condition worsen as a result of surrounding interference or noise, the quality of the video will deteriorate for example as a result of increasing packet loss or lengthy packet retransmission.

Embodiments propose an adaptive and efficient solution to control a data transmission rate of a wireless transmission device based on the current data transmission rate capacity of the wireless channel. Embodiments may use the 802.11 WLAN protocol including 802.11 a/b/g/n and 802.11AC with OFDM technology at either a 2.4 GHz or 5 GHz band or 802.11AD at a 60 GHz band, or the 802.11AD WPAN protocol including for example UWB or BT, etc as would be recognized by one skilled in the art. Embodiments are particularly suited to the transmission of video data in wireless display systems. It is noted that by "video," what is meant in the context of embodiments is a sequence of still images depicting not only scenes in motion but also still scenes. Audio information may also be included.

Referring to FIG. 1, a system is shown according to one embodiment. The system 100 may for example include a device 105, such as a Pc or notebook, which may include a processor and a memory 1104 as shown. The device 105 may use a video encoder 110 to compress video data/a video signal. The device 105 may further include a Transmitter 115 which may transmit the compressed video data via an antenna 120 through an interface protocol by way of a wireless channel 125. The interface protocol may include a LAN 801.11 a/b/g/n, 802.11 AC and 802.11AD protocol, or a PAN protocol such as, for example, UWB, BT. The compressed video signal may be received by a WiFi receiver 130 what is part of a WiDi (wireless display) Adaptor 135 by way of an antenna 140. The WiFi receiver 130 may send the received compressed video data to a video decoder 145 for video decompression, after which the decompressed video data may be sent to a display device such as HDTV 150 using an interface protocol such as High-Definition Multimedia Interface (HDMI). Other interface protocols may include, by way of example, Mobile Industry Processor Interface (MIPI) Display Serial interface (DSI), regardless of the content of the display data. Thus, both device 105 and adaptor 135 may support wireless communications. Although not shown, embodiments also encompass integrating the wireless adaptor into the TV to save an HDMI wired connection, or to have a wireless connection between the adaptor and the TV. As further seen in FIG. 1, memory 104 may store processing instructions in the form of a channel monitor tool (CMT) 155, which may be configured to direct the processor to determine a current data transmission capacity or wireless channel 125 (C bps). CMT 155 is further configured to direct e processor determine whether the current data transmission rate capacity channel 125 (for example, an average video bit rate of A bps) is less than a current data transmission rate through channel 125 (C bps). If so, the CMT 155 is then configured to direct the processor to control a data transmission rate of transmitter 115, for example by directing encoder 110 to encode the next set of data at a corrected data transmission rate (B bps) that is lower than or equal to the current data transmission rate capacity of channel 125 (C bps with B≤C). For example, B may be selected to be lower than C. In addition, if the current data transmission rate capacity of channel 125 is higher than a current data transmission rate through channel 125 (C bps), CMT 155 may also direct the processor to control a data transmission rate of transmitter 115 for example by directing encoder 110 to encode the next set of data at a corrected transmission rate (N bps) that is higher than the current data transmission rate (A bps) but still lower than the current data transmission rate capacity of channel 125. For example, according to a preferred embodiment, B or N as the case may be may be set to represent between about 50% and about 70% of the current data transmission rate capacity of the channel. According to the shown embodiment of FIG. 1, when WiDi is running, the Transmitter 115 may send information regarding video data, such as packet information (i.e. physical data rate, number of passing packets, number of failing packets, etc.) to processor 102. Using the CMT, the processor may estimate the instantaneous channel capacity, that is, the current data transmission rate capacity of the channel using the information regarding video data sent from the transmitter 115. The CMT may therefore run simultaneously with other wireless display applications of the wireless display systems, in order to determine the current data transmission rate capacity, the CMT may for example take into consideration channel utilization data from other radios present within a range of the wireless channel. For example, the CMT may use the following equation to determine the current data transmission range capacity of the channel:

$$WiDiChanCap = \frac{\sum_{i=min(MCSRate)}^{i=max(MCSRate)} NumPacket(i) * (1 - PER(i))}{\sum_{i=min(MCSRate)}^{i=max(MCSRate)} NumPacket(i) * \frac{1}{XXXTpt(i)}} \left(1 - \frac{Channel\ busy}{Totaltime}\right) \quad (Eq.\ 1)$$

where:
  WiDiChanCapacity is the current data transmission rate capacity of the channel;
  i is the physical data rate;
  MCSRate is the modulation and coding rate representing the physical layer link speed based on the protocol being used;
  PER is the packet error rate per each physical data rate, that is the ratio of number of failed packets on the one hand and number of total transmitted packets on the other hand;
  NumPacket is the number of packet transmitted with each rate;
  XXXTpt is a maximum throughput of the channel based on a "XXX" protocol; the XXX protocol could include any suitable protocol such as, for example, UDP, TCP or RIP, for example with a video contention window of 7 (min) and 15 (max), coordinated with a medium access layer or MAC layer;
  channelbusy is the time that the wireless channel is occupied by other co-existing radio interference since the wireless channel may be shared; and
  Totaltime is the time set aside to check the channel busy time.

According to some embodiments, the CMT may be configured to allow the processor to determine the current data transmission rate capacity of the channel within a predetermined time interval, such as 100 ms, 500 ms, 1 second or any other interval programmed as part of the CMT code. A minimum loop rate for determining the current data transmission rate capacity of the charnel may for example depend on the amount of time it would take for any change in bit-rate to take effect within the channel from the time a data transmission rate capacity in the channel is detected until a change in transmission rate actually takes effect. For example, if it takes one second for a change in bit-rate to take effect within the channel from the time that a change in the current data transmission rate capacity is detected, it would make sense to set the loop rate for determining the current data transmission rate capacity of the channel at 1 second or more. For example, keeping in mind that the video may be encoded with a group of pictures (GOP), the current data transmission rate capacity of the channel could change sometime during the transmission of a fast GOP. However, the encoder could start getting ready to change the data transmission rate at the beginning of next GOP, and the change may then take effect only at the end of that next GOP. A maximum amount of time between detection of a change in current data transmission rate capacity and a change in transmission rate actually taking effect may therefore be close to two GOP durations. It would therefore be preferable to set the loop rate for determining the current data transmission rate capacity of the channel at a time interval close to this maximum amount of time or longer, although other loop rates are within the purview of embodiments.

According to one implemented example, an IPERF, which is a commonly used network testing tool written in C++ language that can create TCP and UDP data streams and measure the throughput of a network that is carrying them, was used to generate and send UDP traffic to simulate different video data transmission rates (starting from 5 Mbps, and going up to 15 Mbps, 20 Mbps, and 25 Mbps at 60 second intervals. IPERF was also used to calculate throughput over the channel while a CMT tool was running simultaneously in order to indicate current channel conditions. The average channel throughput calculated by the CMT was found to match the IPERF results.

Using a CMT, such as, for example, a CMT as described, would allow the encoding/compression of video data adaptively according to wireless channel conditions. Thus, if the wireless channel can support to high data transmission rate, the encoder may encode the video data at a high resolution. On the other hand, advantageously, if the channel is noisy and can support only a lower data rate, the encoder may encode the video data at a lower resolution. Using a lower data rate ensures that no or fewer data packets are lost and that the video quality is maintained at a user acceptable level. In addition, such adaptive coding schemes contribute to reduce network jitter and lower buffer delay. As previously noted, the above solution is compatible for example with the 801.11 WLAN protocol including 802.11 a/b/g/n and 802.11AC with OFDM technology at either a 24 GHz or 5 GHz band or 802.11AD at a 60 GHz band, or the 802.11AD WPAN protocol including for example UWB or BT, etc as would be recognized by one skilled in the art, other protocols however being within the purview of embodiments. Embodiments may be particularly suited to the transmission of video data in wireless display systems.

Thus, although exemplary embodiments have been described for the most part with respect to video encoding for use in wireless display systems, embodiments are not so limited, and may broadly involve an adaptive control of the wireless transmission rate of any wireless signal based on a current data transmission rate capacity of a wireless channel to transmit the signal.

In some embodiments, transmitter 115 may be configured to transmit Orthogonal Frequency-Division Multiplex (OFDM) communication signals over a multicarrier communication channel. The OFDM signals may comprise a plurality of orthogonal subcarriers. In some of these multicarrier embodiments, transmitter 115 may be part of a Wireless Local Area Networks (WLANs) communication station such as a Wireless Access Point (WAP), base station or a mobile device including a Wireless-Fidelity (Wi-Fi) device. In some other embodiments, transmitter 115 may be configured to transmit signals that were transmitted using one or more other modulation techniques such as spread spectrum modulation (e.g., Direct Sequence Code Division-Multiple Access (DS-CDMA) and/or Frequency Hopping Code Division-Multiple Access (FH-CDMA)), Time Division-Multiplexing (TDM) modulation, and/or Frequency Division-Multiplexing (FDM) modulation, although the scope of the embodiments is not limited in this respect.

In some embodiments, device 105 may include a portable wireless communication device, such as a Personal Digital Assistant (FDA), a laptop or portable computer with wireless communication capability, a web tablet, a wireless telephone, an instant messaging device, a digital camera, an access point, a television, a medical device (e.g., a heart rate monitor, a blood pressure monitor, etc.), or other device that may receive and/or transmit information wirelessly.

Antennas 120 and 140 may comprise one or more directional or omni-directional antennas, including, for example, dipole antennas, monopole antennas, patch antennas, loop antennas, micro-strip antennas or other types of antennas suitable for transmission of RE signals.

Embodiments may be implemented in one or a combination of hardware, firmware, and software. Embodiments may also be implemented as instructions stored on a machine-readable medium, which may be read and executed by at least one processor to perform the operations described herein. A machine-readable medium may include any mechanism for storing or transmitting information in a form readable by a machine (e.g., a computer). A machine-readable medium may include, but is not limited to, FLASH memory, optical disks, Compact Disks-Read Only Memory (CD-ROM), Digital Versatile/Video Disks (DVD), Read Only Memory (ROM), Random Access Memory (RAM) Erasable Programmable Read-Only Memory (EPROM), Electrically Erasable Programmable Read-Only Memory (EEPROM), magnetic or optical cards, propagation media or other type of machine-readable media suitable for storing electronic instructions. For example, embodiments may be downloaded as a computer program which may be transferred from a remote computer (e.g., a server) to a requesting computer (e.g., a client) by way of data signals embodied in a carrier wave or other propagation medium via a communication link (e.g., a modem or network connection).

Figure 2:
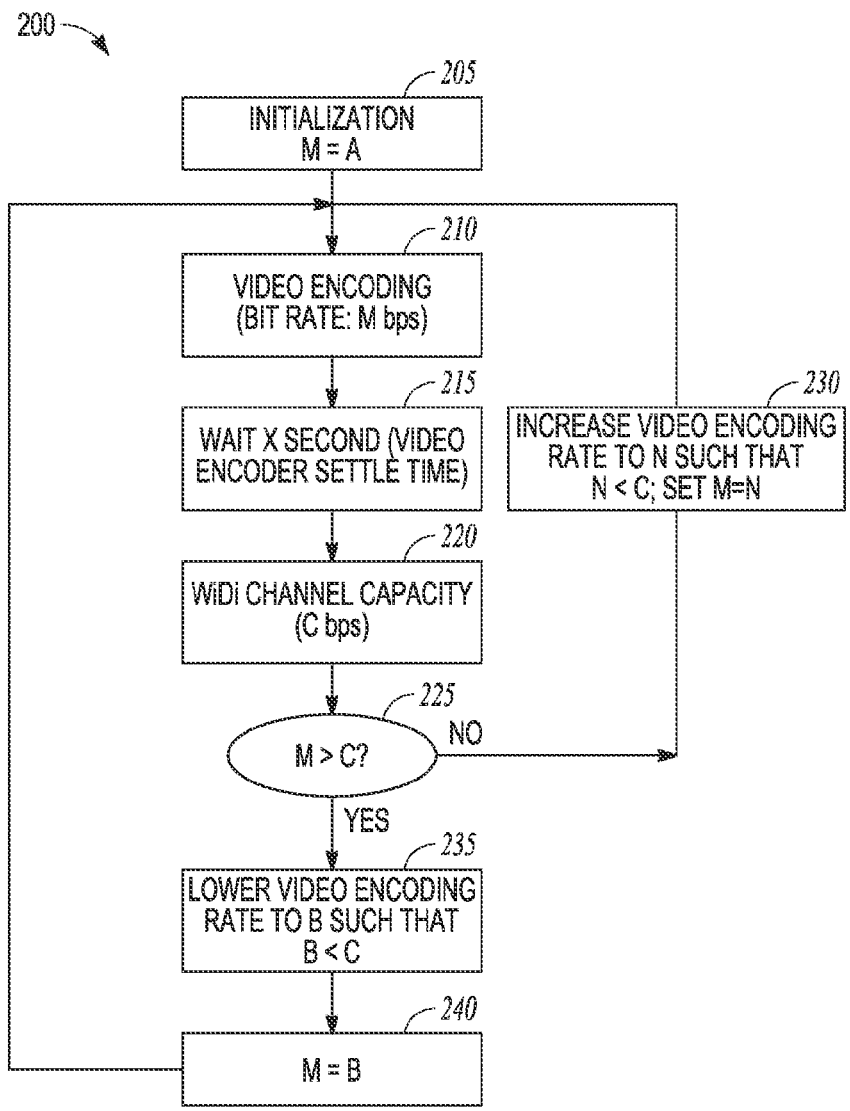
FIG. 2 illustrates in flow diagram format, a method to adaptively control video data transmission rate in a wireless display system according to one embodiment.

Referring next to FIG. 2, a method embodiment is shown in block diagram format. The method to adaptively control data transmission rate is illustrated at method 200, which involves initialization the encoding bit-rate M bps to be equal to an initial bit-rate of A bps at 205. The method may further include encoding video data at an encoding bit-rate of M bps 210. At the beginning of video data transmission, M will be equal to A as set by the initialization 205. Initialization may for example be effected by an encoder such as encoder 110 of FIG. 1. According to one embodiment, the encoder may be configured to set the initialization bit-rate M at a value that is less than a typical value associated with encoder initialization, which is currently set at about 8 Mbps. Thus, by way of example, the initialization bit-rate could be set to equal about 2 Mbps. Setting the initialization bit-rate at a lower value may enhance the adaptiveness of a system and method according to embodiments by allowing a robust mechanism to adaptively and seamlessly increase the data transmission rate below a maximum threshold value (such as, for example, a bit-rate value that is about 50% to about 70% of the current data transmission rate capacity of the channel) without affecting user experience. At block 215, the encoder may undergo a settle time or wait period for a predetermined amount of time x, for example, the settle time allowing the bit-rate set by the encoder to actually take effect within the channel. Thereafter, at block 220, the WiDi channel capacity, that is, the current data transmission rate capability C bps of the channel may be determined. For example, a CMT may be used to determine the current data transmission rate capability of the channel. Then, at block 225, a determination is made as to whether the current data transmission rate or encoding rate M is higher than or equal to the channel capacity C. If yes, then, at block 235, the video encoding rate may be lowered to a value of B bps which is less than C. Then, at block 240, the encoding rate is set to B bps and the setting of the encoding rate is used to encode video at block 210. However, if at block 225 M is determined to be less than C, then, at block 230, the video encoding rate is increased to N bps such that N is less than C, and M is set to equal N. Thereafter, at block 210, the setting of the encoding rate is used to encode video. Alternative embodiments may involve for example not including block 230, or not lowering the video encoding rate at block 235 if M is determined to be equal to C. Other alternatives are within the purview of embodiments.

Figure 3:
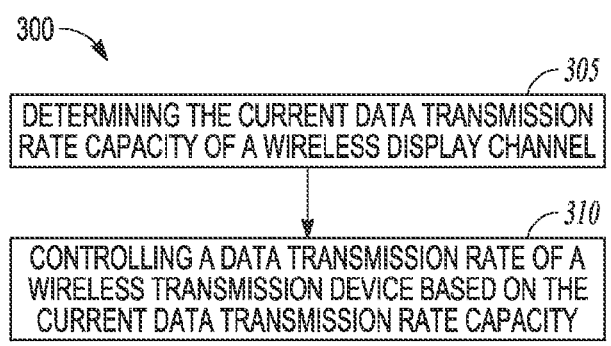
FIG. 3 illustrates, in flow diagram format, a method to adaptively control wireless data transmission rates according to another embodiment.

Referring next to FIG. 3, an alternative method embodiment 300 may involve, at block 305, determining a current data transmission rate capacity of a wireless channel, and at block 310, controlling a data transmission rate of a wireless transmission device based on the current data transmission rate capacity of the wireless channel. Examples for an implementation of this method embodiments are provided with respect to FIGS. 1 and 2 described in detail above.

Having disclosed embodiments and the best mode, modifications and variations may be made to the disclosed embodiments while remaining within the scope of the embodiments as defined by the following claims.

What is claimed is:

1. A method for controlling transmission of video to a wireless display device, the method comprising:
controlling a video encoding rate for encoding video at a wireless transmission device based on a current data transmission rate capacity of a wireless channel, the current data transmission rate capacity being based on transmission-side measurement of channel availability, physical data rate, and packet error rate; and
transmitting encoded video on the wireless channel at a data transmission rate not to exceed the current data transmission rate capacity, in response to the transmission-side measurement indicating the data transmission rate being less than the current data transmission rate capacity, increasing the data transmission rate with wherein higher-resolution video encoding is used for higher data transmission rate capacities, and in response to the transmission-side measurement indicating the data transmission rate being higher than the current data transmission rate capacity reducing the data transmission rate with lower-resolution video encoding is used for lower data transmission rate capacities, determining whether the display device is able to receive encoded video at different encoding rates; and when the display device is not able to receive encoded video at different encoding rates, the method includes:
refraining from controlling the video encoding rate; and
transmitting the encoded video at a constant data transmission rate.

2. The method of claim 1 wherein controlling comprises:
encoding the video at an increased video resolution when the current data transmission rate capacity of the wireless channel increases; and
encoding the video at a decreased video resolution when the current data transmission rate capacity of the wireless channel decreases.

3. The method of claim 2 further comprising determining the current data transmission rate capacity of a wireless channel.

4. The method of claim 3 wherein the current data transmission rate comprises a current video data transmission rate, and
wherein the current data transmission rate capacity comprises a current video data transmission rate capacity.

5. The method of claim 4, wherein controlling further comprises:
determining a current video data transmission rate of the wireless transmission device; and
encoding video data to be transmitted by the wireless transmission device on the wireless channel with a corrected video data transmission rate that is lower than the video data transmission rate capacity of the wireless channel when the current video data transmission rate capacity is determined to be lower than the current video data transmission rate.

6. The method of claim 3, wherein determining the current data transmission rate capacity comprises estimating the current transmission rate capacity using channel utilization data from other wireless devices present within a range of the wireless channel.

7. The method of claim 3, wherein determining the current data transmission rate capacity comprises determining the current data transmission rate within a predetermined time interval.

8. The method of claim 1 wherein transmitting comprises transmitting the encoded video using OFDM signals over a multicarrier communication channel in accordance with an IEEE 802.11 protocol.

9. The method of claim 8 further comprising establishing a direct link with the wireless display device for the transmission of the encoded video, the direct link being established as a peer-to-peer link or in accordance with a direct link setup technique.

10. A wireless transmission device arranged to transmit video to a wireless display device, the wireless transmission device comprising:
an encoder arranged to control a video encoding rate for encoding video at a wireless transmission device based on a current data transmission rate capacity, the current data transmission rate capacity being based on transmission-side measurement of channel availability, physical data rate, and packet error rate; and
a transmitter arranged to transmit the encoded video at a data transmission rate not to exceed the current data transmission rate capacity, wherein the encoder is arranged to encode at higher-resolution video encoding in response to the transmission-side measurement indicating the data transmission rate being less than the current data transmission rate capacity, for higher data transmission rate capacities, and to encode at lower-resolution video encoding in response to the transmission-side measurement indicating the data transmission rate being higher than the current data transmission rate capacity for lower data transmission rate capacities; the wireless transmission device further comprising:

processing circuitry arranged to determine whether the display device is able to receive encoded video at different encoding rates; and when the display device is not able to receive encoded video at different encoding rates, the encoder is arranged to refrain from controlling the video encoding rate and the transmitter is arranged to transmit the encoded video at a constant data transmission rate.

11. The wireless transmission device of claim 10 wherein the encoder is arranged to:
encode the video at an increased video resolution when the current data transmission rate capacity of the wireless channel increases; and
encode the video at a decreased video resolution when the current data transmission rate capacity of the wireless channel decreases.

12. The wireless transmission device of claim 11 wherein the current data transmission rate comprises a current video data transmission rate, and
wherein the current data transmission rate capacity comprises a current video data transmission rate capacity.

13. The wireless transmission device of claim 10 wherein the transmitter is arranged to transmit the encoded video using OFDM signals over a multicarrier communication channel in accordance with an IEEE 802.11 protocol.

14. The wireless transmission device of claim 13 wherein the transmitter is arranged to establish a direct link with the wireless display device for the transmission of the encoded video, the direct link being established as a peer-to-peer link or in accordance with a direct link setup technique.

15. A non-transitory computer-readable storage medium that stores instructions for execution by one or more processors to perform operations for controlling transmission of video to a wireless display device, the operations comprising:
controlling a video encoding rate for encoding video at a wireless transmission device based on a current data transmission rate capacity, the current data transmission rate capacity being based on transmission-side measurement of channel availability, physical data rate, and packet error rate;
transmitting encoded video at a data transmission rate not to exceed the current data transmission rate capacity,
in response to the transmission-side measurement indicating the data transmission rate being less than the current data transmission rate capacity, increasing the data transmission rate with wherein higher-resolution video encoding is used for higher data transmission rate capacities, and in response to the transmission-side measurement indicating the data transmission rate being higher than the current data transmission rate capacity reducing the data transmission rate with lower-resolution video encoding is used for lower data transmission rate capacities;

determining whether the display device is able to receive encoded video at different encoding rates; and when the display device is not able to receive encoded video at different encoding rates, the operations include:
refraining from controlling the video encoding rate; and
transmitting the encoded video at a constant data transmission rate.

16. The non-transitory computer-readable storage medium of claim 15 wherein controlling comprises:
encoding the video at an increased video resolution when the current data transmission rate capacity of the wireless channel increases; and
encoding the video at a decreased video resolution when the current data transmission rate capacity of the wireless channel decreases.

17. A method for dynamically controlling transmission rate of video, the method comprising:
encoding video based on a current data transmission rate capacity of a wireless channel, the current data transmission rate capacity being based on transmission-side measurement of channel availability, physical data rate, and packet error rate;
transmitting encoded video to a wireless display device over the wireless channel at a rate not to exceed the current data transmission rate capacity,
wherein the encoding comprises:
encoding video at an increased video resolution in response to the transmission-side measurement indicating an increase of when the current data transmission rate capacity of the wireless channel increases; and
encoding video at a decreased video resolution in response to the transmission-side measurement indicating a decrease of when the current data transmission rate capacity of the wireless channel decreases; and the method further comprising:
determining whether the display device is able to receive encoded video at different encoding rates; and
when the display device is not able to receive encoded video at different encoding rates, the method includes:
refraining from controlling the video encoding rate; and
transmitting the encoded video at a constant data transmission rate.

18. The method of claim 17 wherein the transmitter is arranged to transmit the encoded video using OFDM signals over a multicarrier communication channel in accordance with an IEEE 802.11 protocol, and
wherein the transmitter is arranged to establish a direct link with the wireless display device for the transmission of the encoded video, the direct link being established as a peer-to-peer link or in accordance with a direct link setup technique.

* * * * *